2,729,609
Patented Jan. 3, 1956

2,729,609

POLY TERT-ALKYL SUBSTITUTED CARBOCYCLIC MONOCARBOXYLIC ACIDS IN ALKYD RESINS

Roy W. H. Tess and Thomas F. Mika, Orinda, Calif., assignors to Shell Development Company, Emeryville, Calif., a corporation of Delaware No Drawing. Application October 16, 1952,
Serial No. 315,186

14 Claims. (Cl. 260—16)

This invention relates to improved alkyd resins and compositions containing the same. More particularly, the invention relates to a new class of modified alkyd resins and to their utilization, particularly in the preparation of surface coating compositions.

Specifically, the invention provides new and particularly useful modified alkyds consisting of the resinous reaction products of a mixture comprising a polybasic acid or derivative thereof, a polyhydric alcohol and a modifying agent containing a poly-tert-alkyl-substituted carbocyclic monocarboxylic acid, such as 3,5-di-tert-butylbenzoic acid and, as desired, an additional modifying agent such as one of the non-drying or air-drying type. The invention further provides surface coating compositions and particularly lacquers and baking enamels containing the aforedescribed modified alkyds.

This application is a continuation-in-part of our application, Serial No. 176,248, filed July 27, 1950, now U. S. Patent No. 2,618,616.

Alkyd resins, i. e., resins prepared by reacting polyhydric alcohols with polybasic acids or derivatives thereof, are valuable additives for coating compositions as they generally impart adhesion and depth of finish to the resulting films. The straight alkyds and those modified with non-drying additives, such as benzoic acid, are useful as additives for lacquers and alkyds modified with air-drying components, such as soybean and linseed oil are useful in the preparation of enamels, etc. The usefulness of the alkyds in these applications has, however, been considerably limited by the fact that the films containing these resins are relatively soft and easily marred. Objects coated with lacquer compositions containing these alkyds, for example, generally require special packing and crating to prevent marring and scratching of the surface during shipping and storage. The hardness may in some cases be improved by adding other components, such as urea-formaldehyde resins, but this addition causes the films to lose part of their flexibility. In addition, many of the films containing the above-described alkyds have poor resistance to heat and light and after a short period of exposure to these elements the films become discolored and lose their flexibility and gloss. As a further disadvantage, many of the above-noted alkyds have relatively high viscosities and poor solvent tolerance and these factors place a considerable restriction on the amount of resin that can be contained in the finished coating composition containing the alkyd resin. This latter defect places a distinct limitation on the toughness and durability of the films that can be made from these resins.

It is an object of the invention, therefore, to provide a new class of modified alkyd resins. It is a further object to provide modified alkyd resins having improved properties as additives for coating compositions. It is a further object to provide modified alkyd resins that impart hardness and mar resistance to lacquer and enamel films. It is a further object to provide modified alkyds that have improved resistance to heat and light. It is a further object to provide modified alkyds having low viscosities and improved solvent tolerance. It is still a further object to provide alkyd resins modified with poly-tert-alkyl-substituted carbocyclic monocarboxylic acids and a method for their preparation. It is a further object to provide surface coating compositions having many improved properties and particularly improved hardness and mar resistance. It is a further object to provide baking enamels having improved resistance to heat and light. Other objects and advantages of the invention will be apparent from the following detailed description thereof.

It has now been discovered that these and other objects may be accomplished by modified alkyd resins consisting of the resinous reaction product of a mixture comprising a polybasic acid or derivative thereof, a polyhydric alcohol and a modifying agent comprising a poly-tert-alkyl-substituted carbocyclic monocarboxylic acid, such as 3,5-di-tert-butylbenzoic acid and, as desired, an additional modifying agent such as one of the non-drying and air-drying type. Alkyds prepared in this manner have been found to possess outstanding properties as additives for surface coating compositions, such as lacquers and enamels. These resins, which are in general relatively high melting solids, have an unusually high degree of compatibility with the known film-forming materials and solvents and diluents employed therewith. Solutions containing these alkyds generally have low viscosities so large quantities of the resin may be tolerated to form strong durable films. In addition, films containing these particular alkyds are surprisingly hard and mar resistant and may be subject to considerable impact without marring and chipping. Furthermore, coating compositions, such as baking enamels, containing these alkyds may be subjected to relatively high temperatures for extended periods without undergoing extensive discoloration and loss of flexibility and gloss.

The acids to be used as modifiers for the alkyds of the instant invention comprise the carbocyclic monocarboxylic acids having a ring of six carbon atoms, one of said ring carbon atoms being joined to a carboxyl group and at least two of the other ring carbon atoms being joined to tertiary alkyl radicals. The carbocyclic ring, if desired, may be substituted with other substituents, such as halogen atoms, short straight-chain alkyl radicals, alkoxy radicals and the like. Illustrative examples of these particular acids include 3,5-di-tert-butylbenzoic acid, 3,4-di-tert-amylbenzoic acid, 2,5-di-tert-octylbenzoic acid, 3-tert-butyl-5-tert-octylbenzoic acid, 3-chloro-4,5-di-tert-octylbenzoic acid, 3,5-di-tert-butylcyclohexanecarboxylic acid, 3,5-di-tert-dodecylbenzoic acid, 3,5-di-tert-tetradecylbenzoic acid, 3,4-di-tert-hexylcyclohexanecarboxylic acid, 2-chloro-3,5-di-tert-butylcyclohexanecarboxylic acid, 3-nitro-4,5-di-tert-octylbenzoic acid, 4,5-di-tert-butyl-1-naphthoic acid, 3-butyl-4,5-di-tert-heptylbenzoic acid, 2,3-diethyl-4,5-di-tert-nonylcyclohexanecarboxylic acid, 2,3,5-tri-tert-butylbenzoic acid and 2,3,5-tri-tert-octylcyclohexanecarboxylic acid.

Preferred acids to be used as modifiers are the aromatic monocarboxylic acids having one of the ring carbon atoms joined to a carboxyl group and two to three of the other ring carbon atoms joined to a tertiary alkyl radical, each alkyl group preferably containing from 4 to 16 carbon atoms, such as 3,5-di-tert-butylbenzoic acid, 2,5-di-tert-octylbenzoic acid, 3-methyl-2,5-di-tert-octylbenzoic acid, 3,5-di-tert-hexadecylbenzoic acid, 2-chloro-3-tert-octyl-5-tert-dodecylbenzoic acid and 2-tert-butyl-5-tert-tetradecylbenzoic acid.

Coming under special consideration, particularly because of the fine quality of alkyds that may be produced therefrom as judged by the hardness and mar resistance of the finished coating composition films, are the aromatic monocarboxylic acids possessing a single aromatic ring wherein one of the ring carbon atoms is joined to a carboxyl group, two ring carbon atoms are joined to tert-alkyl radicals containing from 4 to 10 carbon atoms and the remaining ring carbon atoms are joined to a member of the group consisting of hydrogen, chlorine and lower alkyl radicals, preferably straight-chain alkyl radicals containing from 1 to 4 carbon atoms.

Also of special interest, particularly because of their improved solubility characteristics as well as superior quality of the films prepared therefrom, are the aromatic monocarboxylic acids as described in the preceding paragraph wherein each of the tert-alkyl radical contains from 8 to 16 carbon atoms.

The polycarboxylic acids which may be used in the preparation of the novel alkyd resins may be saturated, unsaturated, alicyclic or aromatic and may possess two, three, four or more carboxyl groups. Examples of such acids are malonic, glutaric, succinic, suberic, citric, aconitic, tricarballylic, cyclohexanedicarboxylic, maleic, fumaric, itaconic, citraconic, mesaconic, phthalic, isophthalic, terephthalic, 1,8-naphthalenic, adipic, sebacic, azelaic, pimelic, chlorosuccinic, bromomaleic, dichlorophthalic, dilactic, dihydracrylic and benzophenone-2,4'-dicarboxylic acid.

The preferred polycarboxylic acids to be used in producing the novel alkyd resins are the dicarboxylic acids containing less than 10 carbon atoms, such as succinic acid, glutaric acid, adipic acid, suberic acid, maleic acid, cyclohexanedicarboxylic acid, phthalic acid, diethyl phthalic acid and the like. Particularly preferred polycarboxylic acids are the aromatic dicarboxylic acids containing from 8 to 12 carbon atoms whereas the two carboxyl groups are attached directly to the aromatic ring.

In some cases it may be desirable to utilize other forms of the acid, such as the acid anhydrides or the acid chlorides, as phthalic anhydride, maleic anhydride, succinic chloride and the like.

Esters of the polybasic acids may be utilized in case the novel alkyds are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol and amyl alcohol.

The above-described substituted carbocyclic monocarboxylic acids may be employed as the sole modifying agent or the said acids may be employed in combination with other types of modifiers. If other agents are employed, their selection will depend chiefly upon the type of final product desired. Non-drying alkyds may be prepared by using modifying agents, such as the acids derived from coconut, castor and cottonseed oil, carboxylic acids as lactic acid, benzoic acid, chlorobenzoic acid, stearic acid, salicyclic acid, mucic acid, sorbic acid, butyric acid and propionic acid, and the like, as well as mixtures thereof.

Alkyds having air-drying properties may be prepared by employing various unsaturated modifying agents. Examples of such agents are the acids derived from the drying oils as linseed, soybean, perilla, tung, walnut, oiticica and dehydrated castor oil and the monoglycerides of the fatty acids of these drying oils, such as the monoglycerides of linseed oil and monoglycerides of the fatty acids of soybean oil, and the like, as well as mixtures thereof.

Other types of modifiers include the organic plastic substances, such as protein plastics, natural resins, such as rosin, and synthetic resins. Phenol-aldehyde, urea-aldehyde, alkyd resins and synthetic linear polyamides represent suitable condensation-type synthetic resin modifiers. Large numbers of synthetic resins resulting from the polymerization of unsaturated compounds can also be used as modifiers. Typical examples of this type of agent are resins formed from styrene, alpha-methyl- styrene, vinyl chloride, vinylidene chloride, vinyl acetate, methyl acrylate, methyl methacrylate and derivatives of some of these resins. Another group consists of plastics formed by the polymerization and copolymerization of conjugated dienes, such as butadiene, pentadiene and hexadiene. A special group consists of the resins formed from those compounds having two or more polymerizable non-conjugated double bonds, such as the unsaturated aliphatic polyesters of saturated polybasic acids, e. g., divinyl, diallyl and dimethallyl esters of oxalic, malonic, citric and tartaric acids; the unsaturated polyethers of saturated polyhydric alcohols, e. g., divinyl and diallyl ethers of glycol, diethylene glycol and the corresponding di- and triethers of glycerol, and the like; the unsaturated aliphatic monohydric alcohol esters of unsaturated monocarboxylic acids, i. e., vinyl, allyl and methallyl acrylate; and the unsaturated esters of aromatic dicarboxylic acids, e. g., divinyl, diallyl and dimethallyl phthalate.

In addition to the modifiers already mentioned many other types of modifying agents may be employed. Important compositions are formed in many cases by adding before, during or after the formation of the alkyd materials, such as colophony, shellac, copal, dammar, camphor, naphthalene, anthracene, aryl phosphates, alkyl and aryl phthalates, pitch, asphalt, asbestos, sand, talc, mica, wood flour, cotton and the like.

Preferred modifying agents to be employed with the novel agents of the invention are the members of the group consisting of carboxylic acids, particularly the unsaturated fatty acids, glyceride oils, synthetic resins, natural resins, and mixtures thereof.

In the preparation of the novel alkyd resins any polyhydric alcohol may be combined with any one of the above-described polybasic acids or derivatives thereof and any one of the above-noted substituted carbocyclic monocarboxylic acids, or mixtures of one, two or all three of the said reactants may be employed. If other types of modifying agents are to be used with the said carbocyclic acids, they may be employed singly or in admixture with one another, e. g., a mixture of non-drying agents or drying agents, or a mixture of a non-drying agent with a drying agent may be utilized.

The production of the alkyds may be accomplished by any suitable method. They may be prepared, for example, by mixing the polyhydric alcohol, polybasic acid or derivative thereof and the modifying agent or agents in any order and then heating the resulting mixture, or alternatively, by first heating and reacting the polyhydric alcohol with the polybasic acid or derivative and subsequently adding the modifying agent or agents, or by first heating the alcohol with the modifying agent or agents and then adding the polybasic acid or derivative.

The resins are preferably prepared, however, by mixing the polyhydric alcohol with the polybasic acid or derivative and the desired modifying agent or agents and subjecting the resulting mixture to heat. Ordinarily no catalyst need be employed to effect this reaction, but, if desired, substances, such as p-toluenesulfonic acid, zinc chloride, stannic chloride, calcium acetate, barium acetate, zinc acetate, hydrochloric acid, litharge, etc., in amounts preferably varying from 0.1% to 5% by weight of reactants may be employed.

The proportions in which the alcohol and polybasic acid or derivatives are combined will vary over a considerable range. Ordinarily the polyhydric alcohol and polybasic acid or derivative will be employed in equimolecular amounts, but satisfactory results are obtained when there is up to 35% or 40 mol percent excess of either reactants. Preferably, the polybasic acid or derivative is reacted with an equimolecular to 30 mol percent excess of the polyhydric alcohol.

The amount of the modifying agent to be utilized will vary over a considerable range depending upon the type of product desired. The total amount of the modifying agent or agents will generally vary from 3% to 70% by weight of the resulting resin, with a preferred range varying from 5% to 50% by weight of the said resin. Higher or lower amounts may be employed, however, if desired or necessary. The entire quantity of the modifying agent may be made up of the above-described tert-alkyl-substituted carbocyclic monocarboxylic acids, or it may be made up of a mixture of the tert-alkyl-substituted acids and other components. When mixtures of agents are employed, the ratio in which they are combined will vary according to the nature of the desired product but the amount of the substituted carbocyclic acids should preferably make up at least 2% by weight of the alkyd.

In the preparation of alkyds using a mixture of the tert-alkyl-substituted acids and the air-drying agents as described above, it is preferred to employ from about 5% to 40% by weight of the alkyd of the tert-alkyl-substituted acids and from 15% to 50% by weight of the alkyd of the air-drying component. In the preparation of alkyds containing large amounts of the modifying agent, it has been found that particularly desirable products are obtained by employing from 15% to 40% by weight of the alkyd of the tert-alkyl-substituted acid and from 20% to 50% by weight of the alkyd of the air-drying component. In the preparation of the short-oil-type alkyds, it has been found that products having outstanding resistance to discoloration and loss of gloss are obtained by employing from 5.25% to 19% by weight of the alkyd of the tert-alkyl-substituted acids and from 19.75% to 31% by weight of the alkyd of the air-drying component, such as soybean fatty acids.

In the preparation of alkyds using a mixture of the tert-alkyl-substituted acids and the non-drying agents as described above, it is preferred to employ from 5% to 35% by weight of the alkyd of the tert-alkyl-substituted acid and from 5% to 30% by weight of the alkyd of the non-drying agent. Particularly superior results are obtained with the non-drying components, such as coconut fatty acids, when the tert-alkyl-substituted acids are employed in amounts varying from 10% to 25% by weight of the alkyd and the non-drying component in an amount varying from 5% to 20% by weight of the alkyd.

The temperature employed during the resin-forming reaction may vary over a considerable range depending upon the type of reactants, catalysts, etc. In most cases the temperature will range between about 100° C. and about 300° C., with a preferred range varying between 120° C. and 250° C.

The resin-forming reaction may be accomplished in the presence or absence of solvents or diluents. If solvents or diluents are employed, it is desirable to utilize inert organic compounds, such as benzene, toluene, xylene, cyclohexane, chloroform, carbon tetrachloride and the like.

It is preferred in most cases to accomplish the resin-forming reaction under a blanket of an inert gas, at least during the initial stage of the reaction. By an inert gas is meant one substantially devoid of oxygen, such as nitrogen, carbon dioxide and the like. Atmospheric, superatmospheric or subatmospheric pressures may be used.

The water formed during the reaction may be removed during the said reaction or at its completion. It is preferably removed substantially as fast as it is formed therein. The removal of the water may be accomplished by any suitable means, such as distillation and the like.

Since some of the alkyds are heat-convertible, care should be taken during the reaction to avoid converting the resin to a step beyond that of being fusible. This will occur if the reaction mixture is overheated or heated too long. To avoid such difficulty, the course of the reaction is conveniently followed by making determinations of the viscosity and acid number upon samples withdrawn from the reaction mass or by other well-known methods. Ordinarily the heating is continued until the viscosity has reached the desired value and the acid number has been reduced to a value between about 3 and 30.

When the reaction is substantially complete as shown by the above-described methods, the inert solvents or diluents, remaining water, uncombined reactants and by-products are preferably removed from the reaction mixture. Removal is conveniently accomplished by vacuum distillation, although fractional distillation, precipitation, etc., may also be utilized.

If alkyd resins having extremely low acid numbers are desired, they may be conveniently prepared by the ester-exchange method mentioned above. According to this process the esters of the polyhydric alcohol and/or esters of the polycarboxylic acids in the proportion described hereinabove for the alcohols and acids, are heated together in the presence of an ester-exchange catalyst, and the alcohol, acid or ester formed in the reaction is removed, preferably as fast as it is formed.

The novel modified alkyds of the invention may be utilized for a variety of important industrial purposes. They may be used, for example, as shellac substitutes, as a resinous binder for molding compositions and for many other uses in the various acts.

The alkyds of the present invention are particularly useful in the preparation of coating compositions. The air-drying alkyds may, for example, be used by themselves in solution with various solvents to produce clear baked coatings or they may be used in combination with various synthetic and natural drying oils to produce improved varnish-type products. The air-drying alkyds may also be used in combination with pigments and/or other synthetic resins, such as urea-aldehyde resins and melamine-aldehyde resins. When the air-drying alkyds of the invention are used with latter group of resins, it has been found that compositions having unusually high resistance to alkali and good resistance to color and gloss retention may be obtained by using combinations made up of 15% to 40% by weight of the urea- or melamine-aldehyde resin and the remainder being the alkyd resin modified with the tert-alkyl-substituted acid.

The non-drying alkyds are especially valuable as additives for coating compositions containing urea- and/or melamine-aldehyde type resins, cellulose derivatives and the vinyl-type polymers. In the use of the non-drying alkyds with the urea-aldehyde and melamine-aldehyde resins, particularly valuable products are obtained by using combinations made up of 10% to 35% by weight of the urea- and melamine-aldehyde resin and the rest being the acid modifying agent.

The novel alkyds are also valuable as additives for coating compositions containing cellulose derivatives, such as cellulose nitrate, cellulose acetate, cellulose acetate butyrate, cellulose propionate, cellulose isobutyrate, cellulose crotonate, cellulose stearate and cellulose valerate; ethyl cellulose, methyl cellulose, benzyl cellulose, gycol cellulose, cellulose acetopropionate, cellulose acetotartrate and the like and mixtures thereof.

The preferred cellulose derivatives to be used with the novel resin is nitrocellulose. Various grades of nitrocellulose may be employed. Ordinarily, R. S. ½ sec. nitrocellulose will be used, although lower viscosity grades like R. S. ¼ sec. or higher viscosity grades like R. S. 6 sec. may be employed, if desired.

A single alkyd of the invention may be added to the above-described film-forming materials or solutions thereof, or a mixture of two or more of the said alkyds may be utilized. The amount of the alkyds to be added will vary over a considerable range depending upon the type of film-forming material, intended use of the finished product, etc. In general, 1 part to 300 parts of resin will be used for every 100 parts of film-forming material. Ordinarily, in the production of coating compositions, such as lacquers, the amount of the alkyd will vary from 25 parts to 150 parts.

In the preparation of coating compositions, the alkyds and film-forming materials are combined together in a liquid vehicle which is usually employed in the preparation of such coatings, as ethyl acetate, isopropyl acetate, n-butyl acetate, methyl ethyl ketone, isobutyl ketone, acetone, ethylene glycol ethyl ether, toluene, xylene, ethyl alcohol, n-butyl alcohol, various petroleum fractions, and the like, and mixtures thereof. The amount of the vehicle employed will vary over a wide range depending chiefly upon the viscosity desired in the finished solution. In general, amounts of vehicle varying from 5% to 95% of the total solids content are usually satisfactory.

Other materials, such as plasticizers like dibutyl phthalate, dioctyl phthalate, tricresyl phosphate, and the like, as well as other resins, such as urea-formaldehyde and melamine-formaldehyde resins, etc. may also be added. If colored compositions are desired, pigments and coloring materials, such as titanium pigments, may be incorporated in appropriate amounts.

The coating compositions containing the novel alkyds are superior to many of the related coatings now available in industry. The compositions form finishings having excellent hardness, good gloss and improved resistance to heat and light. Coating compositions in appropriate solvents may be applied to substantially any surface, such as steel or wood either primed or unprimed by spraying, brushing or other methods. The solvents may be evaporated at room temperature but in many cases it is preferred to bake the coatings by application of infra-red rays or in a suitable oven. In the latter case, high temperatures may be used without discoloring or causing decomposition of the coating.

To illustrate the manner in which the invention will be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

*Example I*

A non-drying alkyd resin modified with 3,5-di-tert-butylbenzoic acid was prepared in the following manner. A mixture comprising 48.2% by weight of 3,5-di-tert-butylbenzoic acid, 27.6% by weight of phthalic anhydride and 24.2% by weight of glycerol (36.1% excess glycerol) was placed in a flask equipped with thermowell and stainless steel stirrer. The content of the flask was heated under at atmosphere of nitrogen upwards from 22° C. to 270° C. over a period about 3 hours and then held at that temperature for about 1 hour. At the end of the reaction, the resulting alkyd was blown for about 20 minutes with carbon dioxide. The resulting alkyd had an acid No. of 4.3 (mg. KOH/g.), melting point of 81° C. and was completely soluble (50% solution) in acetone, toluene, ethanol and a commercial solvent made up of about 60% aromatics and 40% aliphatics.

A lacquer was prepared by combining one part of the above-described alkyd with 1 part of nitrocellulose in a solvent consisting of 56% n-butyl acetate, 4% ethyl alcohol and 40% xylene. Films of the lacquer were cast on glass panels, force dried two hours at 80° C. and then allowed to stand at room temperatures. The resulting films were much harder and had better mar resistance than a similar film prepared from an alkyd containing an equivalent amount of benzoic acid as well as a film prepared from an alkyd containing an equivalent amount of mono-tert-butylbenzoic acid.

Alkyds having related properties are obtained by replacing the 3,5-di-tert-butylbenzoic acid in the above-described process with equivalent amounts of each of the following: 2,4-di-tert-amylbenzoic acid, 3,5-di-tert-octylbenzoic acid, 3,5-di-tert-nonylbenzoic acid and 3-chloro-4,5-di-tert-butylbenzoic acid.

*Example II*

A soybean oil fatty acid 3,5-di-tert-butylbenzoic acid modified alkyd resin was prepared in the following manner. A mixture comprising 20.4% by weight soybean fatty acids, 16.7% by weight 3,5-di-tert-butylbenzoic acid, 37.2% by weight phthalic anhydride, 24.9% by weight glycerol, 0.8% by weight fumaric acid and xylene azeotropic agent was placed in a flask equipped with a phase separation head, thermometer well, stainless steel stirrer and nitrogen bubbler. The contents of the flask were then heated upwards from 20° C. to 250° C. over a period of about two hours and then held at that temperature for about 1 hour and 45 minutes. A solution of the alkyd in xylene (39.3% solids) had an acid No. of 11.6 based on solids, and a viscosity of E—F.

A solution of the alkyd containing 0.2% cobalt based on resin solids was spread on steel panels and baked at 150° C. for 30 minutes. The resulting films were very hard and mar resistant. The films had a Sward hardness of 41 compared to a value of 25 for a similar film prepared from an alkyd containing an equivalent amount of benzoic acid and a value of 31 for a similar film prepared from an alkyd containing an equivalent amount of mono-tert-butylbenzoic acid.

70 parts of the above-described soybean fatty acid 3,5-di-tert-butylbenzoic acid modified alkyd was combined with 30 parts of urea-formaldehyde resin in a solution made up of 80% xylene and 20% butanol and the resulting mixture sprayed on steel panels and cured at 150° C. The resulting film had better hardness and mar resistance than a similar film prepared from an alkyd containing an equivalent amount of p-tert-butylbenzoic acid and soybean-fatty acids.

White baking enamels are prepared from the above-described soybean fatty acid 3,5-di-tert-butylbenzoic acid modified alkyd by mixing the said alkyd with titanium dioxide, xylene and a drier according to the following formula:

31.8% titanium dioxide
34.1% alkyd resin solids
34.1% xylene
0.05% cobalt based on resin solids Each of the coatings is sprayed on steel panels and the films cured for 20 to 30 minutes at 150° C. The resulting films are very hard and mar resistant and have good color and gloss.

Alkyds giving similar superior results may be obtained by replacing the soybean fatty acids in the above-described process with equivalent amounts of each of the following: linseed oil fatty acids, tung oil fatty acids, monoglyceride of linseed oil fatty acids and methyl elaeostearate.

*Example III*

A coconut fatty acid 3,5-di-tert-butylbenzoic acid modified alkyd resin was prepared in the following manner. A mixture comprising 25.8% glycerol, 40.3% phthalic anhydride, 14.6% coconut fatty acids and 18.6% 3,5-di-tert-butylbenzoic acid was placed in a flask equipped with a phase separation head, thermometer well, stainless steel stirrer and carbon dioxide bubbler. The contents of the flask were then heated upwards from 20° C. to 240° C. over a period of about four hours and then held at that temperature for 1 hour. The finished alkyd had an acid number of 8 (mg. KOH/g. on solids bases) and a viscosity of T–U at 80% solids in xylene.

About 90 parts of the above-described alkyds was combined with 10 parts of an urea-formaldehyde resin in a solution containing 80% xylene and 20% butanol and the resulting mixture placed on steel and glass panels and cured at 150° C. Some of the properties of the film are shown below in comparison to a similar film prepared from 90 parts of an alkyd containing equivalent amounts of mono-tert-butylbenzoic acid and coconut fatty acids and 10 parts of urea-formaldehyde resin:

| Test | Alkyd containing 3,5-di-tert-butyl-benzoic acid | Alkyd containing p-tert-butylbenzoic acid |
| --- | --- | --- |
| Scratch with Fingernail | very slight | slight. |
| Print test [1] | very slight print | considerable print. |
| Adhesion | good | |
| Flexibility [2] | passed | passed. |

[1] Loose weave canvas was placed over film on glass panels and 5 lbs./sq. in. load applied for 1 minute after baking.
[2] Steel panels bent over 1/8" mandrel.

The films were then heated at 200° C. for 1 hour and the properties of the films then tested. The improved resistance of the films to discoloration and loss of gloss under these conditions is shown below in comparison to results obtained with a similar film prepared from 90 parts of an alkyd containing equivalent amounts of mono-tert-butylbenzoic acid and 10 parts of urea-formaldehyde resin:

| Test | Alkyd containing 3,5-di-tert butylbenzoic acid | Alkyd containing p-tert-butylbenzoic acid |
| --- | --- | --- |
| Color | very slight yellowing | considerable yellowing. |
| Loss of gloss | no apparent loss of gloss | slight loss of gloss. |

Alkyds giving similar superior results may be obtained by replacing the coconut fatty acids in the above-described process with equivalent amounts of each of the following: castor oil and cottonseed oil fatty acids.

*Example IV*

Several short-oil modified alkyds containing 3,5-di-tert-butylbenzoic acid and dehydrated castor oil are prepared as follows. A mixture comprising phthalic anhydride, glycerol, fumaric acid and the modifying agents as indicated in the table below is placed in a flask as shown in the preceding example and the mixture heated upwards from 22° C. to 230° C. over a period of 2 hours and then held at that temperature for about 45 minutes. At the end of the reaction the alkyd is blown for 20 minutes with carbon dioxide. The specific ingredients and proportions used in the preparation of these alkyds are shown in the following table:

| Alkyd No. | Glycerol | Phthalic Acid | Fumaric Acid | Dehydrated Castor oil | 3,5-di-tert-butylbenzoic Acid |
| --- | --- | --- | --- | --- | --- |
| 1 | 28.2 | 37.6 | .78 | 28.7 | 7.6 |
| 2 | 26 | 38.8 | .8 | 21.2 | 13.2 |

White baking enamels are prepared from each of the short-oil alkyds shown above by mixing the said alkyds with titanium dioxide, xylene and a drier according to the following formula:

31.8% titanium dioxide
34.1% alkyd resin solids
34.1% xylene
0.05% cobalt based on resin solids Each of the coatings is sprayed on steel panels and the films cured for 20 to 30 minutes at 150° C. The cured films were very hard and mar resistant and had good gloss and color. To show the good gloss and color retention of these particular alkyds, a portion of each coated panel is covered with aluminum foil and all of the panels exposed to ultraviolet light for about 200 hours. At the end of this time, the foils are removed and both portions of the panel examined to determine loss of color and gloss due to the exposure. The results show that there was no loss of gloss on the above-described panels and no substantial discoloration.

*Example V*

About 350 parts of pentaerythritol, 600 parts of soybean acids, 435 parts of phthalic anhydride and 150 parts of 3,5-di-tert-octylbenzoic acid are mixed together as shown in the preceding example and heated upwards from 20° C. to 230–250° C. for about 3 hours and then held at that temperature for 45 minutes.

White baking enamels prepared from this alkyd by the method shown in the preceding example are hard and have good color and gloss retention.

Other alkyds are obtained by replacing the pentaerythritol in the above-described process with equivalent amounts of each of the following polyhydric alcohols: 1,2,6-hexanetriol, trimethylolpropane and sorbitol.

I claim as my invention:

1. A resinous reaction product of a mixture comprising an acid component of the group consisting of polycarboxylic acids, polycarboxylic acid anhydrides and polycarboxylic acid halides, a polyhydric alcohol and a modifying agent comprising at least one poly-tert-alkyl-substituted carbocyclic monocarboxylic acid.

2. A resinous reaction product as defined in claim 1 wherein the modifying agent consists of a poly-tert-alkyl-substituted benzoic acid.

3. A resinous reaction product of a mixture comprising a polycarboxylic acid, an aliphatic polyhydric alcohol containing at least three esterifiable hydroxyl groups, said acid and alcohol being present in amounts varying up to 40 mol percent excess of either reactant and a modifying agent comprising a di-tertiary alkyl-substituted benzoic acid and an air-drying modifying agent of the group consisting of drying oil fatty acids and monoglycerides of the drying oil fatty acids.

4. A resinous reaction product as defined in claim 1 wherein the modifying agent is 3,5-di-tert-butylcyclohexanecarboxylic acid.

5. A resinous reaction product of a mixture comprising an aromatic dicarboxylic acid, an equimolecular to 40 mol percent excess of an aliphatic polyhydric alcohol containing at least three hydroxyl groups, 5% to 35% by weight of the reaction product of a di-tertiary alkyl-substituted benzoic acid and 5% to 30% by weight of the reaction product of a non-drying modifying agent.

6. A modified alkyd comprising a resinous reaction quality of a mixture of phthalic anhydride, an excess to 40 mol percent excess of glycerol, 10% to 25% by weight of the alkyd of 3,5-di-tertiary butylbenzoic acid and 5% to 20% by weight of the alkyd of coconut oil fatty acids.

7. A short-oil modified alkyd comprising the resinous reaction product of a mixture of phthalic anhydride, an excess to 40 mol percent excess of glycerol, 5.25% to 19% by weight of the said alkyd of 3,5-di-tertiary-butylbenzoic acid and 19.75% to 31% by weight of the alkyd of dehydrated castor oil.

8. A modified alkyd comprising the resinous reaction product of a mixture of phthalic anhydride, an excess to 30 mol percent excess of pentaerythritol, 5% to 40% by weight of the said alkyd of 3,5-di-tertiary-octylbenzoic acid and 15% to 50% by weight of the alkyd of soybean acid.

9. A coating composition comprising the alkyd defined in claim 1 and a film-forming component of the group consisting of cellulose esters and ethers, urea-aldehyde and melamine-aldehyde resins, vinyl resins and drying oils.

10. A coating composition comprising the alkyd defined in claim 2 and a cellulose ester.

11. A coating composition comprising a solvent solution containing the oil modifying alkyd defined in claim 3 and a drier.

12. A coating composition comprising nitrocellulose and the alkyd resin defined in claim 5.

13. A coating composition comprising 60% to 80% by weight of alkyd defined in claim 8 and 20% to 40% by weight of an urea-aldehyde resin.

14. A coating composition comprising the alkyd defined in claim 6 and an urea-aldehyde resin.

References Cited in the file of this patent

UNITED STATES PATENTS

| | | |
|---|---|---|
| 2,606,161 | Marling | Aug. 5, 1952 |
| 2,618,616 | Tess et al. | Nov. 18, 1952 |